US012724157B2

(12) United States Patent
Wang et al.

(10) Patent No.: US 12,724,157 B2
(45) Date of Patent: Sep. 1, 2026

(54) EXTENDED WIDE-LANE CARRIER PHASE AVAILABILITY USING INERTIAL MEASUREMENT UNIT (IMU) FEEDBACK

(71) Applicant: QUALCOMM Incorporated, San Diego, CA (US)

(72) Inventors: Min Wang, Tustin, CA (US); Ning Luo, Cupertino, CA (US); Gengsheng Zhang, Cupertino, CA (US); William Morrison, San Francisco, CA (US); Abdelmonaem Lakhzouri, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 567 days.

(21) Appl. No.: 18/188,426

(22) Filed: Mar. 22, 2023

(65) Prior Publication Data

US 2024/0319383 A1 Sep. 26, 2024

(51) Int. Cl.

| | |
|---|---|
| ***G01S 19/43*** | (2010.01) |
| ***G01S 19/03*** | (2010.01) |
| ***G01S 19/26*** | (2010.01) |
| ***G01S 19/29*** | (2010.01) |
| ***G01S 19/47*** | (2010.01) |
| ***G01S 19/52*** | (2010.01) |

(52) U.S. Cl.

CPC .............. *G01S 19/26* (2013.01); *G01S 19/03* (2013.01); *G01S 19/29* (2013.01); *G01S 19/47* (2013.01)

(58) Field of Classification Search

CPC .......... G01S 19/26; G01S 19/03; G01S 19/29; G01S 19/47; G01S 19/52; G01S 19/49; G01S 19/32; G01S 19/43

See application file for complete search history.

(56) References Cited

U.S. PATENT DOCUMENTS 5,177,489 A * 1/1993 Hatch ..................... G01S 19/11 342/450
6,278,945 B1 * 8/2001 Lin ......................... G01S 19/26 701/472

(Continued)

FOREIGN PATENT DOCUMENTS

WO WO-2009043183 A1 * 4/2009 ........... G01C 21/165
WO WO-2023191955 A1 * 10/2023 ............ H04W 64/00

OTHER PUBLICATIONS

International Search Report and Written Opinion—PCT/US2024/012134—ISA/EPO—Jun. 11, 2024.

*Primary Examiner* — Charles N Appiah
(74) *Attorney, Agent, or Firm* — Weaver Austin Villeneuve & Sampson LLP

(57) ABSTRACT

Techniques for extended wide-lane carrier phase availability using inertial measurement unit (IMU) feedback are disclosed. The techniques can include determining an IMU-based position differential based on first IMU data received from an IMU of the mobile device, detecting a wide-lane cycle slip based on a wide-lane differential carrier phase (DCP) measurement and the IMU-based position differential, responsive to detecting the wide lane cycle slip, adjusting the wide-lane DCP measurement based on the IMU-based position differential to obtain a corrected wide-lane DCP measurement, and generating a global navigation satellite system (GNSS)-based positioning estimate for the mobile device based on the corrected wide-lane DCP measurement.

30 Claims, 9 Drawing Sheets

(56) References Cited

U.S. PATENT DOCUMENTS

| | | | | |
|---|---|---|---|---|
| 6,496,778 | B1 * | 12/2002 | Lin | G01S 19/55<br>701/472 |
| 2010/0090890 | A1 * | 4/2010 | Wirola | G01S 19/04<br>342/357.44 |
| 2012/0265440 | A1 * | 10/2012 | Morgan | G01C 21/165<br>701/472 |
| 2013/0234885 | A1 * | 9/2013 | Geier | G01S 19/49<br>342/357.23 |
| 2015/0116146 | A1 * | 4/2015 | Dickman | G01S 19/43<br>342/357.51 |
| 2018/0239030 | A1 * | 8/2018 | Chen | G01S 19/47 |
| 2021/0325544 | A1 * | 10/2021 | Bageshwar | G01S 19/52 |
| 2022/0026583 | A1 * | 1/2022 | van Diggelen | G01S 19/29 |
| 2022/0163679 | A1 * | 5/2022 | Muthuraman | H04W 4/024 |

* cited by examiner

400

EXTENDED WIDE-LANE CARRIER PHASE AVAILABILITY USING INERTIAL MEASUREMENT UNIT (IMU) FEEDBACK

BACKGROUND

1. Field of Disclosure

The present disclosure relates generally to the field of wireless communications, and more specifically to mobile device positioning using radio frequency (RF) signals.

2. Description of Related Art

The global navigation satellite system (GNSS) is widely used for location and location applications. Accuracy is important for many such applications. In conjunction with GNSS-based positioning, a GNSS receiver tracks and measures GNSS signals on one or more GNSS bands, and the position of the GNSS receiver is estimated based on measurements of the GNSS signals. A GNSS receiver establishes a phase lock on a GNSS signal in order to track that GNSS signal. In challenging environments, in which obstacles, interference, or other impediments hamper the ability of GNSS receivers to receive GNSS signals, discontinuities may occur in phase locks that the GNSS receivers have established on the GNSS signals. Such discontinuities, which are commonly referred to as cycle slips, can negatively impact the accuracy of GNSS-based positioning.

BRIEF SUMMARY

An example positioning method for a mobile device, according to this disclosure, may include determining an inertial measurement unit (IMU)-based position differential based on first IMU data received from an IMU of the mobile device, detecting a wide-lane cycle slip based on a wide-lane differential carrier phase (DCP) measurement and the IMU-based position differential, responsive to detecting the wide lane cycle slip, adjusting the wide-lane DCP measurement based on the IMU-based position differential to obtain a corrected wide-lane DCP measurement, and generating a global navigation satellite system (GNSS)-based positioning estimate for the mobile device based on the corrected wide-lane DCP measurement.

An example positioning apparatus for a mobile device, according to this disclosure, may include a multi-band global navigation satellite system (GNSS) receiver, a memory, and one or more processors communicatively coupled with the multi-band GNSS receiver and the memory, where the one or more processors are configured to determine an inertial measurement unit (IMU)-based position differential based on first IMU data received from an IMU of the mobile device, detect a wide-lane cycle slip based on a wide-lane differential carrier phase (DCP) measurement and the IMU-based position differential, responsive to detecting the wide lane cycle slip, adjust the wide-lane DCP measurement based on the IMU-based position differential to obtain a corrected wide-lane DCP measurement, and generate a GNSS-based positioning estimate for the mobile device based on the corrected wide-lane DCP measurement.

An example positioning apparatus for a mobile device, according to this disclosure, may include means for determining an inertial measurement unit (IMU)-based position differential based on first IMU data received from an IMU of the mobile device, means for detecting a wide-lane cycle slip based on a wide-lane differential carrier phase (DCP) measurement and the IMU-based position differential, means for responsive to detecting the wide lane cycle slip, adjusting the wide-lane DCP measurement based on the IMU-based position differential to obtain a corrected wide-lane DCP measurement, and means for generating a global navigation satellite system (GNSS)-based positioning estimate for the mobile device based on the corrected wide-lane DCP measurement.

An example non-transitory computer-readable medium may store instructions for positioning for a mobile device, and the instructions may include code for determining an inertial measurement unit (IMU)-based position differential based on first IMU data received from an IMU of the mobile device, detecting a wide-lane cycle slip based on a wide-lane differential carrier phase (DCP) measurement and the IMU-based position differential, responsive to detecting the wide lane cycle slip, adjusting the wide-lane DCP measurement based on the IMU-based position differential to obtain a corrected wide-lane DCP measurement, and generating a global navigation satellite system (GNSS)-based positioning estimate for the mobile device based on the corrected wide-lane DCP measurement.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Figure 1:
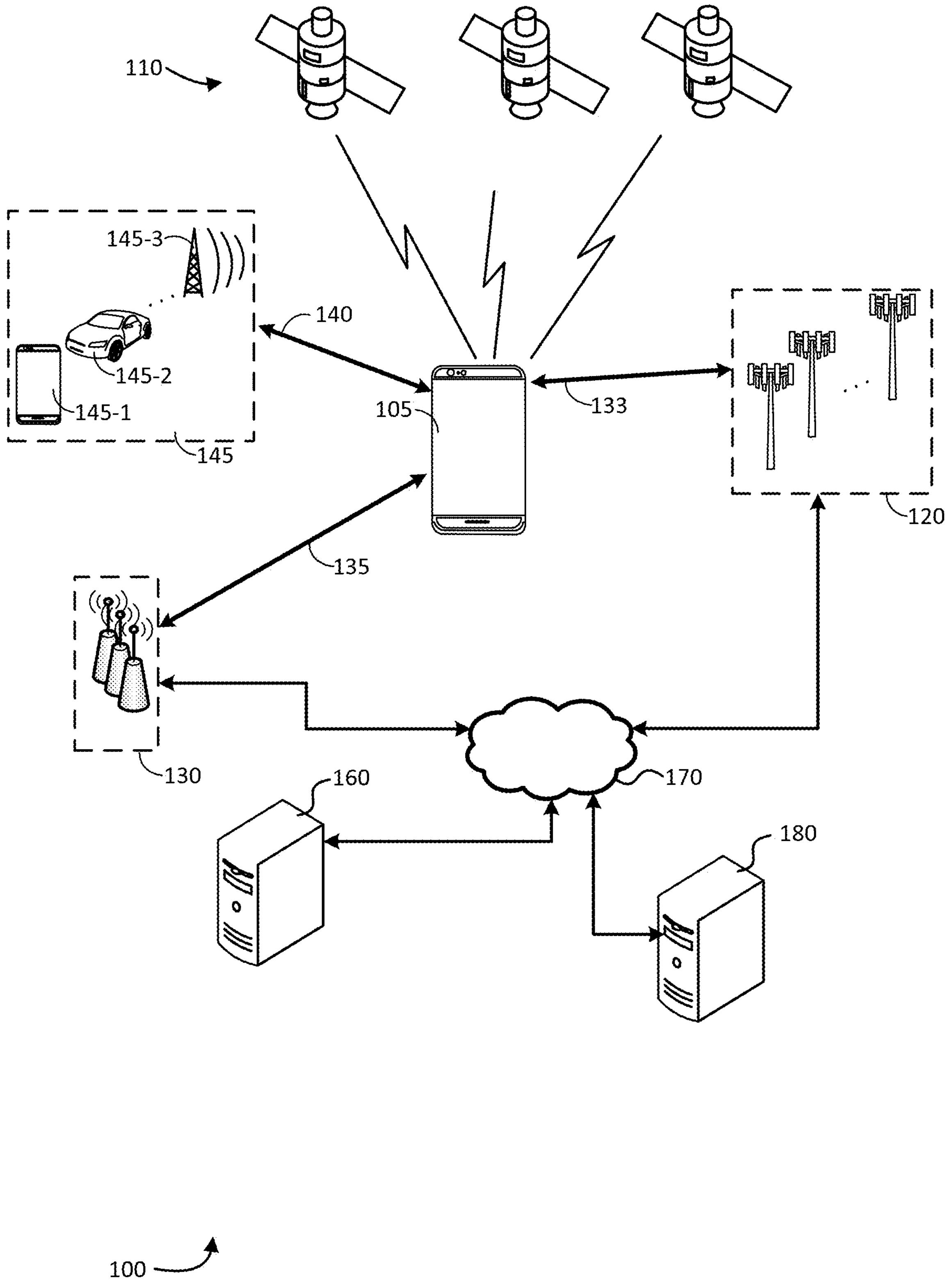
FIG. 1 is a diagram of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) 802.15.4 standards for ultra-wideband (UWB), IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths.

Additionally, unless otherwise specified, references to "reference signals," "positioning reference signals," "reference signals for positioning," and the like may be used to refer to signals used for positioning of a mobile device. As described in more detail herein, such signals may comprise any of a variety of signal types but may not necessarily be limited to a Positioning Reference Signal (PRS) as defined in relevant wireless standards.

Various aspects relate generally to wireless communications, and more particularly to mobile device positioning using RF signals. Some aspects more specifically relate to the use of IMU feedback to extend the availability of high-accuracy GNSS-based positioning estimates in challenging environments. According to some aspects, GNSS components of a mobile device can be configured to conduct differential carrier phase (DCP)-based positioning based on measurements of a wide-lane combination of two GNSS bands. A positioning fusion engine of the mobile device can be configured to generate fusion-based positioning estimates based on GNSS-based estimates provided by the GNSS components and IMU data provided by an IMU of the mobile device. The positioning fusion engine can provide IMU-based position differentials as feedback to the GNSS components, which can use that feedback to detect and correct cycle slips in its wide-lane DCP measurements. As a result, the positioning fusion engine can continue to provide high-accuracy GNSS-based positioning estimates even as challenging conditions begin to induce cycle slips. By extending the availability of high-accuracy GNSS-based positioning measurements in this manner, overall positioning accuracy can be enhanced.

FIG. 1 is a simplified illustration of a positioning system 100 in which a mobile device 105 may use the techniques provided herein for extended wide-lane carrier phase availability using IMU feedback, according to various embodiments. The positioning system 100 can include: a mobile device 105; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate a location of the mobile device 105 based on RF signals received by and/or sent from the mobile device 105 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one mobile device 105 is illustrated, it will be understood that many mobile devices (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 may be communicatively coupled to the network 170. In some embodiments, the base station 120*s* may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. The functionality performed by a base station 120 in earlier-generation networks (e.g., 3G and 4G) may be separated into different functional components (e.g., radio units (RUs), distributed units (DUs), and central units (CUs)) and layers (e.g., L1/L2/L3) in view Open Radio Access Networks (O-RAN) and/or Virtualized Radio Access Network (V-RAN or vRAN) in 5G or later networks, which may be executed on different devices at different locations connected, for example, via fronthaul, midhaul, and backhaul connections. As referred to herein, a "base station" (or ng-eNB, gNB, etc.) may include any or all of these functional components. An AP 130 may comprise a Wi-Fi AP or a Bluetooth® AP or an AP having cellular capabilities (e.g., 4G LTE and/or 5G NR), for example. Thus, mobile device 105 can send and receive information with network-connected devices, such as location server 160, by accessing the network 170 via a base station 120 using a first communication link 133. Additionally or alternatively, because APs 130 also may be communicatively coupled with the network 170, mobile device 105 may communicate with network-connected and Internet-connected devices, including location server 160, using a second communication link 135, or via one or more other mobile devices 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The location server 160 may comprise a server and/or other computing device configured to determine an estimated location of mobile device 105 and/or provide data (e.g., "assistance data") to mobile device 105 to facilitate location measurement and/or location determination by mobile device 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for mobile device 105 based on subscription information for mobile device 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of mobile device 105 using a control plane (CP) location solution for LTE radio access by mobile device 105. The location server 160 may further comprise a Location Management Function (LMF) that supports location of mobile device 105 using a control plane (CP) location solution for NR or LTE radio access by mobile device 105.

In a CP location solution, signaling to control and manage the location of mobile device 105 may be exchanged between elements of network 170 and with mobile device 105 using existing network interfaces and protocols and as signaling from the perspective of network 170. In a UP location solution, signaling to control and manage the location of mobile device 105 may be exchanged between location server 160 and mobile device 105 as data (e.g. data transported using the Internet Protocol (IP) and/or Transmission Control Protocol (TCP)) from the perspective of network 170.

As previously noted (and discussed in more detail below), the estimated location of mobile device 105 may be based on measurements of RF signals sent from and/or received by the mobile device 105. In particular, these measurements can provide information regarding the relative distance and/or angle of the mobile device 105 from one or more components in the positioning system 100 (e.g., GNSS satellites 110, APs 130, base stations 120). The estimated location of the mobile device 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the mobile device 105 may be estimated at least in part based on measurements of RF signals 140 communicated between the mobile device 105 and one or more other mobile devices 145, which may be mobile or fixed. As illustrated, other mobile devices may include, for example, a mobile phone 145-1, vehicle 145-2, static communication/positioning device 145-3, or other static and/or mobile device capable of providing wireless signals used for positioning the mobile device 105, or a combination thereof. Wireless signals from mobile devices 145 used for positioning of the mobile device 105 may comprise RF signals using, for example, Bluetooth® (including Bluetooth Low Energy (BLE)), IEEE 802.11x (e.g., Wi-Fi®), Ultra Wideband (UWB), IEEE 802.15x, or a combination thereof. Mobile devices 145 may additionally or alternatively use non-RF wireless signals for positioning of the mobile device 105, such as infrared signals or other optical technologies.

Mobile devices 145 may comprise other mobile devices communicatively coupled with a cellular or other mobile network (e.g., network 170). When the mobile device 105 for which the position is to be determined is a user equipment (UE) and one or more other mobile devices 145 comprising UEs are used in the position determination, the mobile device 105 may be referred to as the "target UE," and each of the other mobile devices 145 used may be referred to as an "anchor UE." For position determination of a target UE, the respective positions of the one or more anchor UEs may be known and/or jointly determined with the target UE. Direct communication between the one or more other mobile devices 145 and mobile device 105 may comprise sidelink and/or similar Device-to-Device (D2D) communication technologies. Sidelink, which is defined by 3GPP, is a form of D2D communication under the cellular-based LTE and NR standards.

According to some embodiments, such as when the mobile device 105 comprises and/or is incorporated into a vehicle, a form of D2D communication used by the mobile device 105 may comprise vehicle-to-everything (V2X) communication. V2X is a communication standard for vehicles and related entities to exchange information regarding a traffic environment. V2X can include vehicle-to-vehicle (V2V) communication between V2X-capable vehicles, vehicle-to-infrastructure (V2I) communication between the vehicle and infrastructure-based devices (commonly termed roadside units (RSUs)), vehicle-to-person (V2P) communication between vehicles and nearby people (pedestrians, cyclists, and other road users), and the like. Further, V2X can use any of a variety of wireless RF communication technologies. Cellular V2X (CV2X), for example, is a form of V2X that uses cellular-based communication such as LTE (4G), NR (5G) and/or other cellular technologies in a direct-communication mode as defined by 3GPP. The mobile device 105 illustrated in FIG. 1 may correspond to a component or device on a vehicle, RSU, or other V2X entity that is used to communicate V2X messages. In embodiments in which V2X is used, the static communication/positioning device 145-3 (which may correspond with an RSU) and/or the vehicle 145-2, therefore, may communicate with the mobile device 105 and may be used to determine the position of the mobile device 105 using techniques similar to those used by base stations 120 and/or APs 130 (e.g., using multiangulation and/or multilateration). It can be further noted that mobile devices 145 (which may include V2X devices), base stations 120, and/or APs 130 may be used together (e.g., in a WWAN positioning solution) to determine the position of the mobile device 105, according to some embodiments.

An estimated location of mobile device 105 can be used in a variety of applications—e.g. to assist direction finding or navigation for a user of mobile device 105 or to assist another user (e.g. associated with external client 180) to locate mobile device 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of mobile device 105 may comprise an absolute location of mobile device 105 (e.g. a latitude and longitude and possibly altitude) or a relative location of mobile device 105 (e.g. a location expressed as distances north or south, east or west and possibly above or below some other known fixed location (including, e.g., the location of a base station 120 or AP 130) or some other location such as a location for mobile device 105 at some known previous time, or a location of a mobile device 145 at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which mobile device 105 is expected to be located with some level of confidence (e.g. 95% confidence).

The external client 180 may be a web server or remote application that may have some association with mobile device 105 (e.g. may be accessed by a user of mobile device 105) or may be a server, application, or computer system providing a location service to some other user or users which may include obtaining and providing the location of mobile device 105 (e.g. to enable a service such as friend or relative finder, or child or pet location). Additionally or alternatively, the external client 180 may obtain and provide the location of mobile device 105 to an emergency services provider, government agency, etc.

Figure 2:
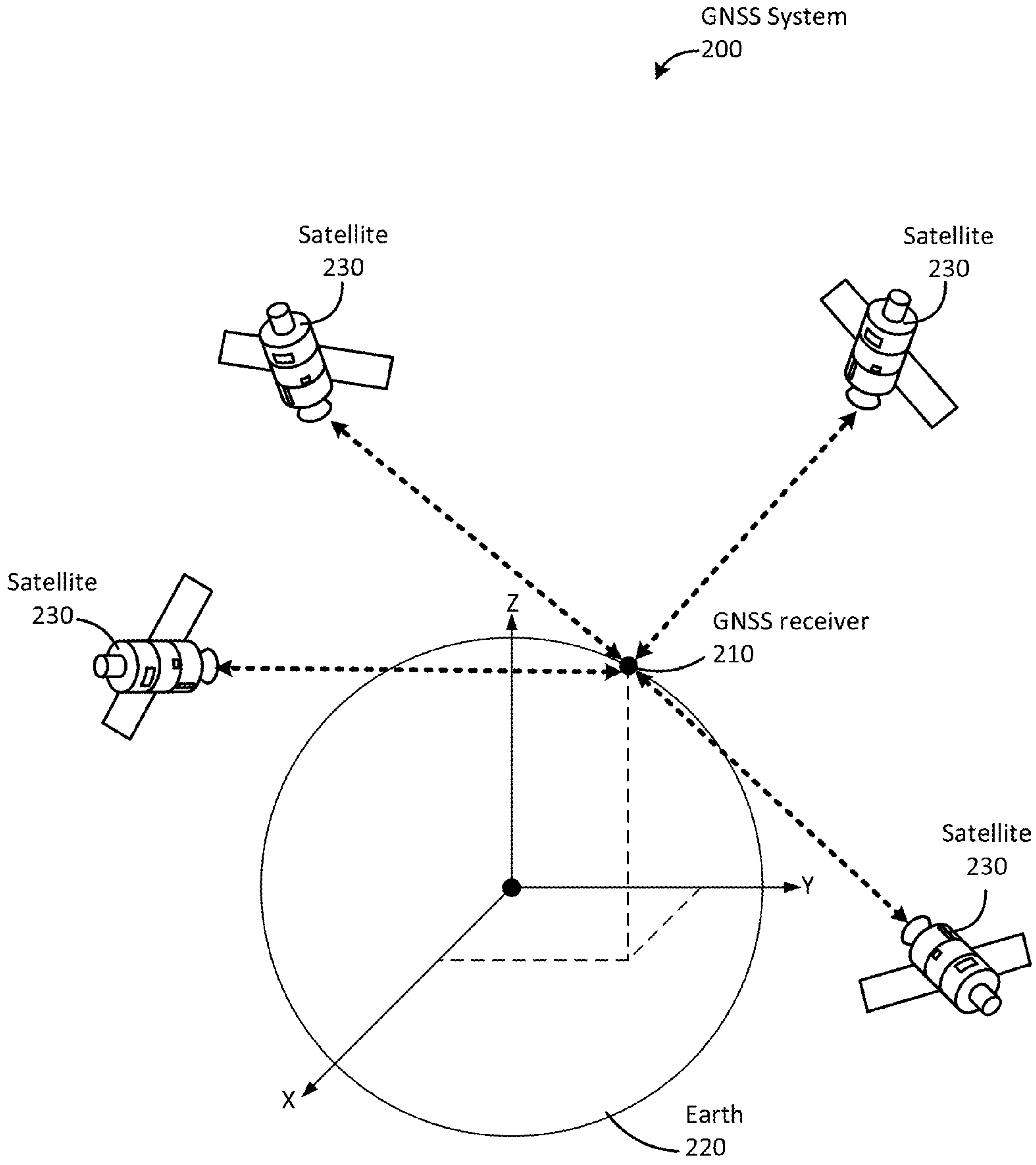
FIG. 2 is a simplified diagram of a GNSS system, according to an embodiment.

FIG. 2 is a simplified diagram of a GNSS system 200, provided to illustrate how GNSS is generally used to determine an accurate location of a GNSS receiver 210 on earth 220. Put generally, the GNSS system 200 enables an accurate GNSS position fix of the GNSS receiver 210, which receives RF signals from GNSS satellites 230 from one or more GNSS constellations. The types of GNSS receiver 210 used may vary, depending on application. In some embodiments, for instance, the GNSS receiver 210 may comprise a standalone device or component incorporated into another device (e.g., mobile device 105 of FIG. 1). In some embodiments, the GNSS receiver 210 may be integrated into industrial or commercial equipment, such as survey equipment, Internet of Things (IoT) devices, etc.

It will be understood that the diagram provided in FIG. 2 is greatly simplified. In practice, there may be dozens of satellites 230 and a given GNSS constellation, and there are many different types of GNSS systems. As noted, GNSS systems include GPS, Galileo, GLONASS, or BDS. Additional GNSS systems include, for example, Quasi-Zenith Satellite System (QZSS) over Japan, Indian Regional Navigational Satellite System (IRNSS) over India, etc. In addition to the basic positioning functionality later described, GNSS augmentation (e.g., a Satellite Based Augmentation System (SBAS)) may be used to provide higher accuracy. Such augmentation may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

GNSS positioning is based on trilateration/multilateration, which is a method of determining position by measuring distances to points at known coordinates. In general, the determination of the position of a GNSS receiver 210 in three dimensions may rely on a determination of the distance between the GNSS receiver 210 and four or more satellites 230. As illustrated, 3D coordinates may be based on a coordinate system (e.g., XYZ coordinates; latitude, longitude, and altitude; etc.) centered at the earth's center of mass. A distance between each satellite 230 and the GNSS receiver 210 may be determined using precise measurements made by the GNSS receiver 210 of a difference in time from when a RF signal is transmitted from the respective satellite 230 to when it is received at the GNSS receiver 210. To help ensure accuracy, not only does the GNSS receiver 210 need to make an accurate determination of when the respective signal from each satellite 230 is received, but many additional factors need to be considered and accounted for. These factors include, for example, clock differences at the GNSS receiver 210 and satellite 230 (e.g., clock bias), a precise location of each satellite 230 at the time of transmission (e.g., as determined by the broadcast ephemeris), the impact of atmospheric distortion (e.g., ionospheric and tropospheric delays), and the like.

To perform a traditional GNSS position fix, the GNSS receiver 210 can use code-based positioning to determine its distance to each satellite 230 based on a determined delay in a generated pseudorandom binary sequence received in the RF signals received from each satellite, in consideration of the additional factors and error sources previously noted. With the distance and location information of the satellites 230, the GNSS receiver 210 can then determine a position fix for its location. This position fix may be determined, for example, by a Standalone Positioning Engine (SPE) executed by one or more processors of the GNSS receiver 210. However, code-based positioning is relatively inaccurate and, without error correction, and is subject to many of the previously described errors. Even so, code-based GNSS positioning can provide an positioning accuracy for the GNSS receiver 210 on the order of meters.

More accurate carrier-based ranging is based on a carrier wave of the RF signals received from each satellite, and may use measurements at a base or reference station (not shown) to perform error correction to help reduce errors from the previously noted error sources. More specifically, errors (e.g., atmospheric errors sources) in the carrier-based ranging of satellites 230 observed by the GNSS receiver 210 can be mitigated or canceled based on similar carrier-based ranging of the satellites 230 using a highly accurate GNSS receiver at the base station at a known location. These measurements and the base station's location can be provided to the GNSS receiver 210 for error correction. This position fix may be determined, for example, by a Precise Positioning Engine (PPE) executed by one or more processors of the GNSS receiver 210. More specifically, in addition to the information provided to an SPE, the PPE may use base station GNSS measurement information, and additional correction information, such as troposphere and ionosphere, to provide a high accuracy, carrier-based position fix. Several GNSS techniques can be adopted in PPE, such as Differential GNSS (DGNSS), Real Time Kinematic (RTK), and Precise Point Positioning (PPP), and may provide a sub-meter accuracy (e.g., on the order of centimeters). (An SPE and/or PPE may be referred to herein as a GNSS positioning engine, and may be incorporated into a broader positioning engine that uses other (non-GNSS) positioning sources.)

Multi-frequency GNSS receiver is use satellite signals from different GNSS frequency bands (also referred to herein simply as "GNSS bands") to determine desired information such as pseudoranges, position estimates, and/or time. Using multi-frequency GNSS may provide better performance (e.g., position estimate speed and/or accuracy) than single-frequency GNSS in many conditions. However, as discussed in more detail hereafter, using multi-frequency GNSS typically uses more power than single-frequency GNSS, e.g., processing power and battery power (e.g., to power a processor (e.g., for determining measurements), baseband processing, and/or RF processing).

Referring again to FIG. 2, the satellites 230 may be members of a single satellite constellation, i.e., a group of satellites that are part of a GNSS system, e.g., controlled by a common entity such as a government, and orbiting in complementary orbits to facilitate determining positions of entities around the world. One or more of the satellites 230 may transmit multiple satellite signals in different GNSS frequency bands, such as L1, L2, and/or L5 frequency bands. The terms L1 band, L2 band, and L5 band are used herein because these terms are used for GPS to refer to respective ranges of frequencies. Various receiver configurations may be used to receive satellite signals. For example, a receiver may use separate receive chains for different frequency bands. As another example, a receiver may use a common receive chain for multiple frequency bands that are close in frequency, for example L2 and L5 bands. As another example, a receiver may use separate receive chains for different signals in the same band, for example GPS L1 and GLONASS L1 sub-bands. A single receiver may use a combination of two or more of these examples. These configurations are examples, and other configurations are possible.

Multiple satellite bands are allocated to satellite usage. These bands include the L-band, used for GNSS satellite communications, the C-band, used for communications satellites such as television broadcast satellites, the X-band, used by the military and for RADAR applications, and the Ku-band (primarily downlink communication and the Ka-band (primarily uplink communications), the Ku and Ka bands used for communications satellites. The L-band is defined by IEEE as the frequency range from 1 to 2 GHz. The L-Band is utilized by the GNSS satellite constellations such as GPS, Galileo, GLONASS, and BDS, and is broken into various bands, including L1, L2, and L5. For location purposes, the L1 band has historically been used by commercial GNSS receivers. However, measuring GNSS signals across more than one band may provide for improved accuracy and availability.

Figure 3:
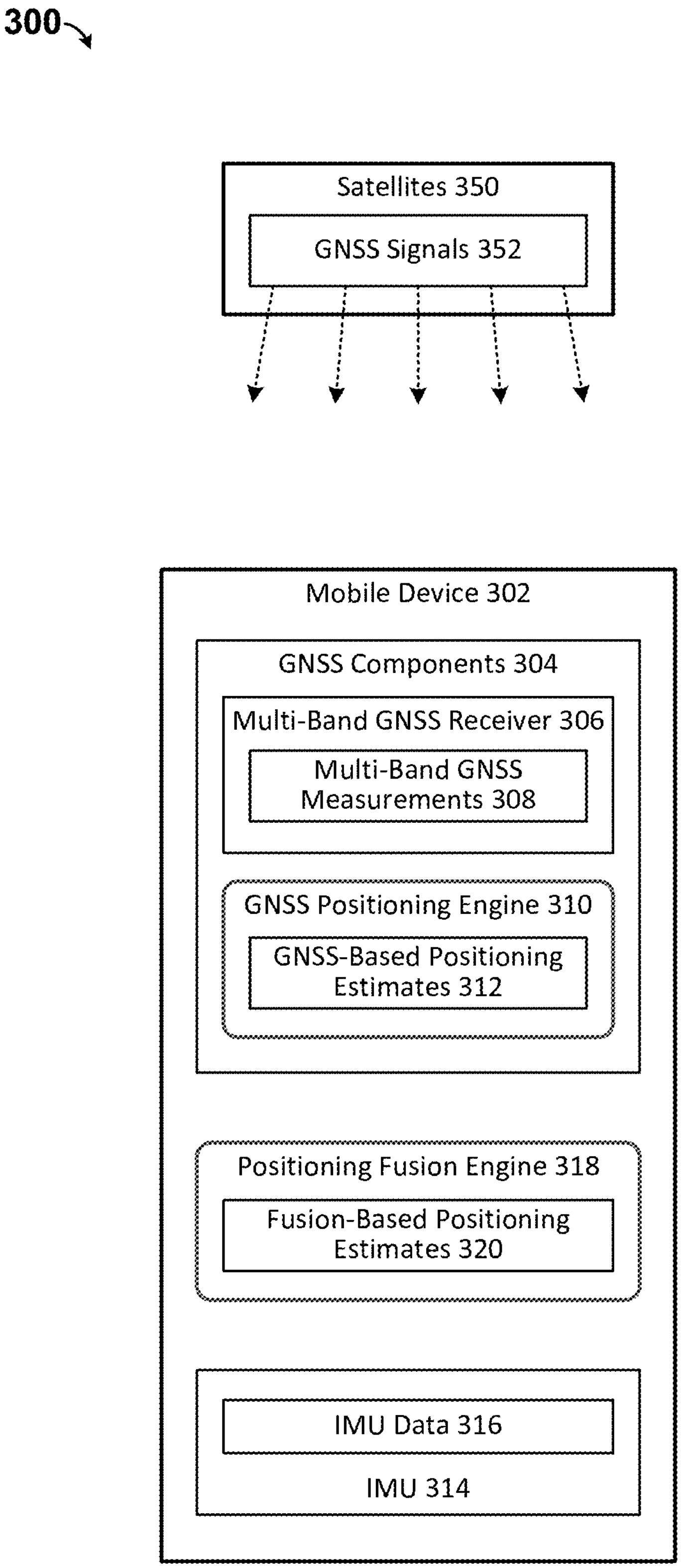
FIG. 3 is a block diagram illustrating a first example operating environment, according to aspects of the disclosure.

FIG. 3 is a block diagram illustrating an example operating environment 300, according to aspects of the disclosure. In operating environment 300, a mobile device 302 can conduct positioning based on measurements of GNSS signals 352 transmitted by satellites 350. In some examples, mobile device 302 be implemented as mobile device 105 of FIG. 1. In some examples, satellites 350 be implemented as GNSS satellites 110 of FIG. 1 or GNSS satellites 230 of FIG. 2.

Mobile device 302 can include GNSS components 304 and an inertial measurement unit (IMU) 314. GNSS components 304 can provide mobile device 302 with GNSS-based positioning capabilities that allow mobile device 302 to conduct positioning based on GNSS signals 352 transmitted by satellites 350. GNSS components 304 can include a multi-band GNSS receiver 306 capable of receiving GNSS signals 352 of multiple carrier frequencies associated with multiple respective GNSS bands. Multi-band GNSS receiver 306 can measure received GNSS signals 352 of multiple carrier frequencies to obtain multi-band GNSS measurements 308.

GNSS components 304 can execute—for example, using one or more included processors (not shown in FIG. 3)—a GNSS positioning engine 310. GNSS positioning engine 310 can generate GNSS-based positioning estimates 312 based on multi-band GNSS measurements 308 provided by multi-band GNSS receiver 306. In some implementations, GNSS-based positioning estimates 312 can include estimated positions and estimated velocities. In some implementations, the estimated positions can be positions of the mobile device estimated with respect to three dimensions. In some implementations, the estimated velocities can be scalar (directionless) parameters representing estimated speeds of motion of the mobile device. In some other implementations, the estimated velocities can be vectors representing estimated speeds of motion of the mobile device and estimated directions of such motion. In some such implementations, the estimated directions can be directions of motion of the mobile device estimated with respect to three dimensions. In some implementations, multi-band GNSS receiver 306 can execute GNSS positioning engine 310. In some implementations, multi-band GNSS receiver 306 can generate multi-band GNSS measurements 308 and then generate GNSS-based positioning estimates 312 based on the multi-band GNSS measurements 308.

IMU 314 can generate IMU data 316 that describes aspects of motion of mobile device 302. These can include aspects of translational motion and aspects of rotational motion. In some implementations, IMU data 316 can describe aspects of motion of mobile device 302 with respect to six degrees of freedom. In some implementations, IMU data 316 can describe translational motion of mobile device 302 with respect to each of three perpendicular axes, and can describe rotational motion of mobile device 302 about each of the three perpendicular axes. IMU 314 may comprise, for example, one or more accelerometers (e.g., collectively responding to acceleration in three dimensions) and/or one or more gyroscopes (e.g., three-dimensional gyroscope(s)).

Mobile device 302 can execute—for example, using one or more included processors (not shown in FIG. 3)—a positioning fusion engine 318. Positioning fusion engine 318 can generate fusion-based positioning estimates 320 based on GNSS-based positioning estimates 312 provided by GNSS positioning engine 310 and IMU data 316 provided by IMU 314. In some implementations, fusion-based positioning estimates 320 can be dead reckoning positioning estimates. In some implementations, fusion-based positioning estimates 320 can include estimated positions and estimated velocities. In some implementations, the estimated positions can be positions of the mobile device estimated with respect to three dimensions. In some implementations, the estimated velocities can be scalar (directionless) parameters representing estimated speeds of motion of the mobile device. In some other implementations, the estimated velocities can be vectors representing estimated speeds of motion of the mobile device and estimated directions of such motion. In some such implementations, the estimated directions can be directions of motion of the mobile device estimated with respect to three dimensions.

Figure 4:
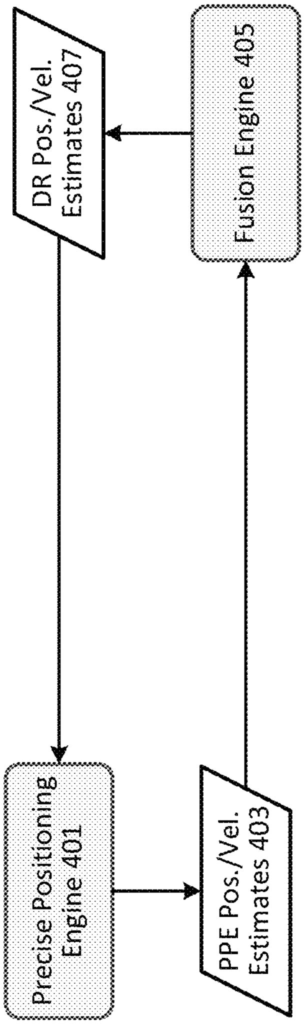
FIG. 4 is a block diagram illustrating an example positioning algorithm, according to aspects of the disclosure.

FIG. 4 is a block diagram illustrating an example positioning algorithm 400, according to aspects of the disclosure. In various examples, in operating environment 300 of FIG. 3, mobile device 302 may generate GNSS-based positioning estimates 312 and fusion-based positioning estimates 320 in conjunction with implementation of positioning algorithm 400.

Positioning algorithm 400 implements a feedback loop between a precise positioning engine 401 and a fusion engine 405. Precise positioning engine 401 can be a carrier phase-based positioning engine that can generate positioning estimates based on a carrier phase of a GNSS signal. In some examples, precise positioning engine 401 can correspond to GNSS positioning engine 310 of FIG. 3. Fusion engine 405 can be a positioning engine that can generate dead reckoning positioning estimates based on IMU data. In some examples, fusion engine 405 can correspond to positioning fusion engine 318 of FIG. 3.

According to positioning algorithm 400, precise positioning engine 401 generates PPE position/velocity estimates 403. In some implementations, PPE position/velocity estimates 403 can correspond to GNSS based positioning estimates 312 of FIG. 3. Precise positioning engine 401 can pass PPE position/velocity estimates 403 to fusion engine 405, which can use PPE position/velocity estimates 403 to calibrate sensor biases and/or to perform device orientation estimation. Fusion engine 405 can generate dead reckoning position/velocity estimates 407 based on PPE position/velocity estimates 403 and on IMU data received from an IMU (not shown). In some implementations, dead reckoning position/velocity estimates 407 can correspond to fusion-based positioning estimates 320 of FIG. 3. Fusion engine 405 can pass dead reckoning position/velocity estimates 407 as feedback to precise positioning engine 401.

Under conditions in which the carrier phase of the GNSS signal can be continuously tracked, precise positioning engine 401 may be able to provide high-accuracy GNSS-based position/velocity estimates, and thus device positioning may rely mainly on the output of precise positioning engine 401. Under conditions in which continuous tracking of the carrier phase is impeded, such that a significant fraction of carrier phase measurements are affected by cycle slip or are invalid, precise positioning engine 401 may be unable to provide high-accuracy GNSS-based position/velocity estimates, and thus device positioning rely mainly on dead reckoning estimates output by fusion engine 405.

As the dead reckoning age—defined as the amount of time that has elapsed since precise positioning engine 401 last provided a valid high-accuracy GNSS-based position/velocity estimate—increases, the quality of the dead reckoning estimates provided by fusion engine 405 may degrade significantly. As a mobile device implementing positioning algorithm 400 initially moves into a challenging environment, impediments on carrier phase tracking may not preclude valid carrier phase measurements, but may subject some carrier phase measurements to cycle slip. As time progresses, impediments on carrier phase tracking may hamper the mobile device's ability to obtain valid carrier phase measurements to such an extent that a significant portion of its carrier phase measurements may be invalid.

According to techniques disclosed herein for extended wide-lane carrier phase availability using IMU feedback, a mobile device can track a wide-lane carrier phase, and can use wide-lane differential carrier phase measurements to generate GNSS-based position/velocity estimates. Due to a larger effective wavelength associated with a wide-lane carrier phase (relative to that associated with a single-band carrier phase), the mobile device can use IMU feedback to accurately assess and remove cycle slip effects from the wide-lane differential carrier phase measurements, allowing it to generate high-accuracy GNSS-based position/velocity estimates under conditions in which it cannot do so using single-band carrier phase measurements. Using such techniques, the point in time at which a mobile device moving into a challenging environment is no longer able to obtain high-accuracy GNSS-based position/velocity estimates—and that dead reckoning performance begins to degrade—can be delayed, and the overall accuracy of positioning operations can be enhanced.

As used herein, the term "wide-lane" refers to a combination of GNSS signals of multiple different frequency bands. A wide-lane carrier phase can thus be, for example, a carrier phase of a combination of GNSS signals on bands L1 and L2, L1 and L5, L2 and L5, or L1, L2, and L5. According to aspects of the disclosure, such a combination can include additionally or alternatively include one or more other frequency bands, including upcoming/planned frequency bands, such as band L6/E6.

Figure 5:
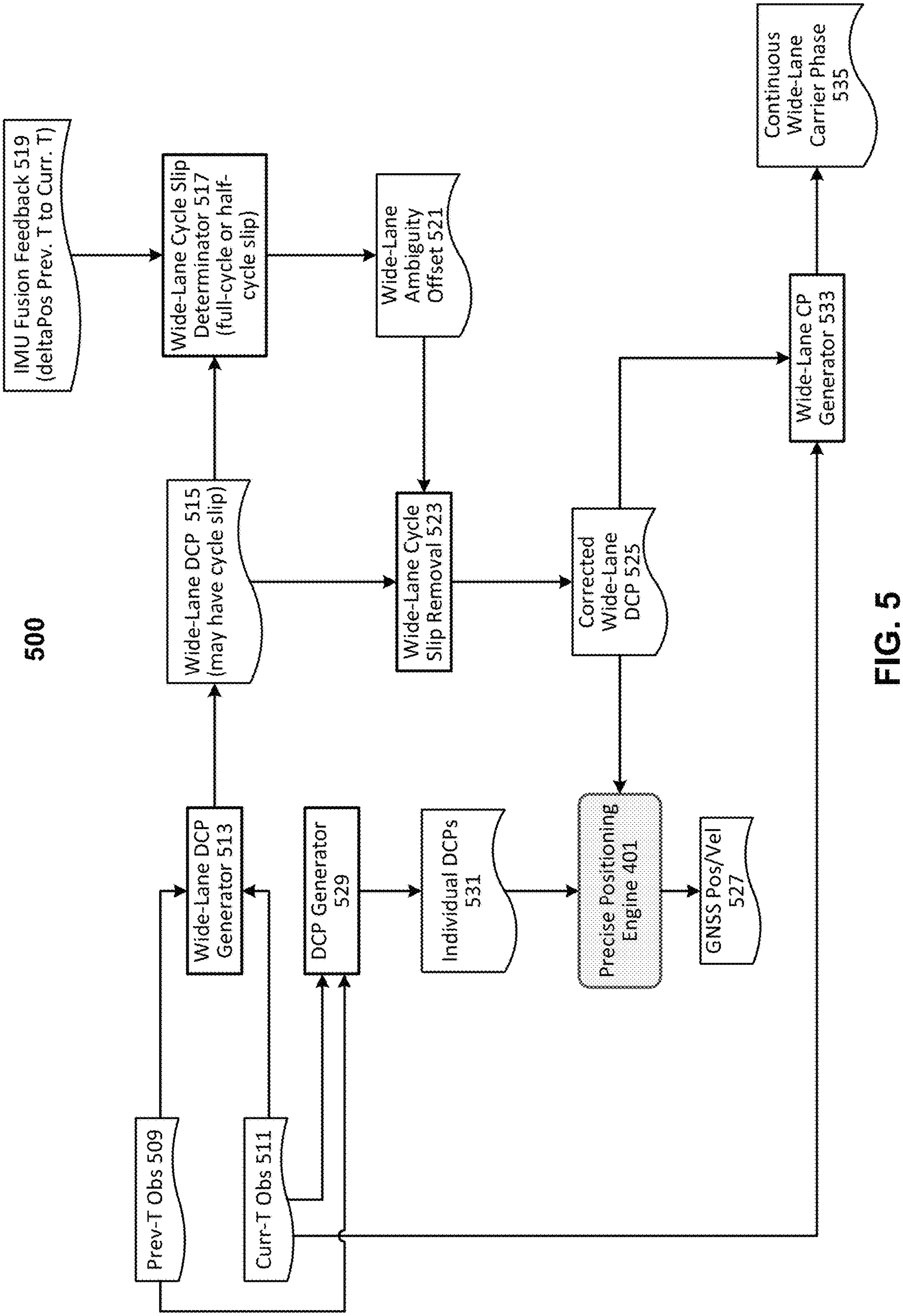
FIG. 5 is a block diagram illustrating an example positioning scheme, according to aspects of the disclosure.

FIG. 5 is a block diagram illustrating an example positioning scheme 500, according to aspects of the disclosure. Positioning scheme 500 may be representative of the implementation of various techniques disclosed herein for extended wide-lane carrier phase availability using IMU feedback. According to positioning scheme 500, a wide-lane DCP generator 513 can generate a wide-lane DCP 515 based on previous-time observations 509 and current-time observations 511. Previous-time observations 509 and current-time observations 511 can comprise multi-band GNSS measurements. According to various implementations, current-time observations 511 can be multi-band GNSS measurements for a current epoch, and previous-time observations 509 can be multi-band GNSS measurements for a previous epoch.

As noted in FIG. 5, wide-lane DCP 515 may (or may not) be affected cycle slip. A wide-lane cycle slip determinator 517 can check wide-lane DCP 515 for cycle slip based on IMU fusion feedback 519. IMU fusion feedback 519 can indicate a deltaPos parameter representing a change in dead reckoning position from a previous time associated with previous-time observations 509 to a current time associated with current-time observations 511. In some implementations, as reflected in FIG. 5, wide-lane cycle slip determinator 517 may be able to detect both full-cycle and half-cycle cycle slips.

In some implementations, wide-lane cycle slip determinator 517 may use IMU fusion feedback 519 to check wide-lane DCP 515 for cycle slip by applying Equation (1) as follows:

$$\nabla N_{CS} = \left\langle \frac{\nabla DCP_{WL} - \nabla \delta\rho}{\lambda_{WL}} \right\rangle \tag{1}$$

where $\nabla$ is the between-satellite differencing operator, $\langle\ \rangle$ is the rounding operator, $N_{Cs}$ is the integer ambiguity offset caused by cycle slip, $\lambda_{WL}$ is the effective wavelength for the integer ambiguity offset, $DCP_{WL}$ is the wide-lane DCP measurement possibly containing the cycle slip, and $\delta\rho$ is a delta-geometry derived from a deltaPos parameter indicated by IMU fusion feedback.

Based on IMU fusion feedback 519, wide-lane cycle slip determinator 517 can determine a wide-lane ambiguity offset 521 that represents an integer ambiguity offset caused by a cycle slip in wide-lane DCP 515. In some implementations, the wide-lane ambiguity offset 521 can indicate an ambiguity offset caused by a full-cycle or half-cycle cycle slip. If wide-lane DCP 515 exhibits cycle slip, wide-lane cycle slip removal 523 can correct wide-lane DCP 515 based on wide-lane ambiguity offset 521 to obtain a corrected wide-lane DCP 525 that is free of cycle slip. If wide-lane DCP 515 does not exhibit cycle slip, wide-lane cycle slip removal 523 can simply use wide-lane DCP 515 as the corrected wide-lane DCP 525. Precise positioning engine 401 can then use corrected wide-lane DCP 525 to generate a GNSS position/velocity estimate 527.

As illustrated in FIG. 5, precise positioning engine 401 can also be capable of accepting individual DCPs 531 provided by DCP generator 529 as inputs for generating GNSS position/velocity 527. In some implementations, if individual DCPs 531 are free of cycle slip, they can be used along with, or in lieu of, corrected wide-lane DCP 525 to generate GNSS position/velocity 527.

In some implementations, as reflected in FIG. 5, positioning scheme 500 can include generating a continuous wide-lane carrier phase 535. Continuous wide-lane carrier phase 535 can represent a wide-lane carrier phase measurement stream. A wide-lane carrier phase generator 533 can create the wide-lane carrier phase measurement stream by repeatedly obtaining current multi-band GNSS measurements (such as current-time observations 511) and corresponding cycle slip-free wide-lane DCPs (such as corrected wide-lane DCP 525) and using them to generate respective wide-lane carrier phase measurements.

Figure 6:
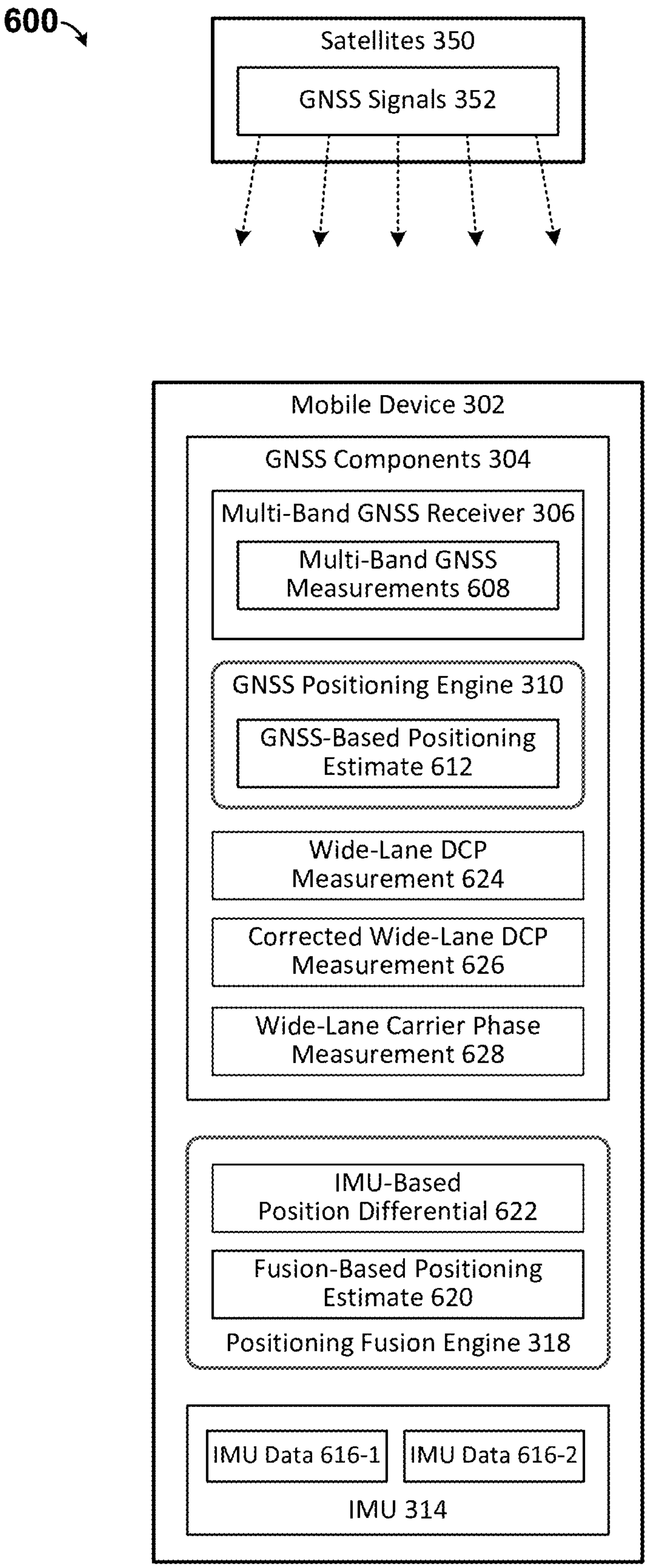
FIG. 6 is a block diagram illustrating a second example operating environment, according to aspects of the disclosure.

FIG. 6 is a block diagram illustrating an example operating environment 600 in which mobile device 302 may implement techniques for extended wide-lane carrier phase availability using IMU feedback. In some examples, mobile device 302 may implement positioning scheme 500 of FIG. 5. In operating environment 600, positioning fusion engine 318 can determine an IMU-based position differential 622 for a time interval (such as an interval between a previous epoch and a current epoch) based on IMU data 616-1 provided by IMU 314. GNSS components 304 can determine a wide-lane DCP measurement 624 for the time interval based on multi-band GNSS measurements 608, which multi-band GNSS receiver 306 can produce by measuring GNSS signals 352 transmitted by satellites 350. In some implementations, multi-band GNSS receiver 306 can produce multi-band GNSS measurements 608 by measuring GNSS signals 352 on an L1/L5 wide-lane band. In some implementations, multi-band GNSS receiver 306 can generate multi-band GNSS measurements 608 and then determine the wide-lane DCP measurement 624 based on the multi-band GNSS measurements 608.

GNSS components 304 can (for example, by implementing operations of wide-lane cycle slip determinator 517 of FIG. 5) detect a wide-lane cycle slip based on wide-lane DCP measurement 624 and IMU-based position differential 622. GNSS components 304 can apply a correction to wide-lane DCP measurement 624 based on IMU-based position differential 622 to obtain a corrected wide-lane DCP measurement 626. In some implementations, applying the correction to wide-lane DCP measurement 624 can include determining a wide-lane integer ambiguity offset associated with the wide-lane cycle slip and correcting wide-lane DCP measurement 624 based on the wide-lane integer ambiguity offset. In some implementations, GNSS components 304 can determine the wide-lane integer ambiguity offset based on wide-lane DCP measurement 624, IMU-based position differential 622, and a wide-lane effective wavelength associated with wide-lane DCP measurement 624. In some implementations, the wide-lane effective wavelength can be approximately 75 centimeters.

GNSS positioning engine 310 can generate a GNSS-based positioning estimate 612 for mobile device 302 based on the corrected wide-lane DCP measurement 626. GNSS-based positioning estimate 612 can be provided to positioning fusion engine 318, which can then generate a fusion-based positioning estimate 620 for mobile device 302 based on GNSS-based positioning estimate 612 and IMU data 616-2 received from IMU 314. In some implementations, GNSS components 304 may determine a wide-lane carrier phase measurement 628 based on corrected wide-lane DCP measurement 626. In some implementations, GNSS components 304 may generate a wide-lane carrier phase measurement stream (not shown) and output the wide-lane carrier phase measurement stream via an interface (not shown), and wide-lane carrier phase measurement 628 may be included in the wide-lane carrier phase measurement stream. In some implementations, GNSS components 304 may execute a measurement engine, and the wide-lane carrier phase measurement stream may be an output of the measurement engine. In some implementations, the wide-lane carrier phase measurement stream can be output via the interface to another device, such as a third-party positioning device, to provide that device with a continuously tracked wide-lane carrier phase for use as a basis for its own positioning calculations.

Figure 7:
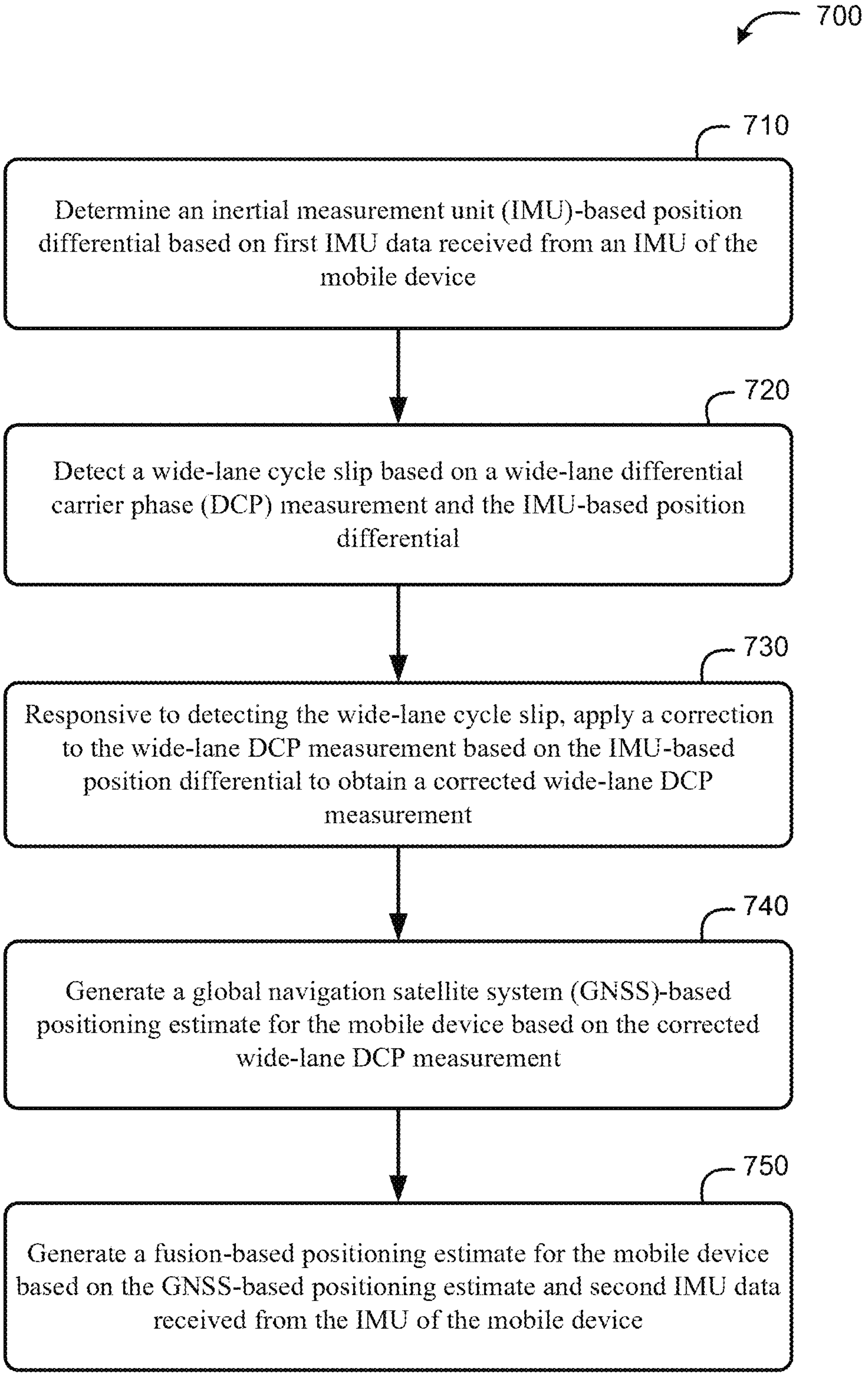
FIG. 7 is a block diagram illustrating a first example positioning method, according to aspects of the disclosure.

FIG. 7 is a block diagram illustrating an example positioning method 700, according to aspects of the disclosure. According to aspects of the disclosure, means for performing the functionality illustrated in one or more of the blocks shown in FIG. 7 may be performed by hardware and/or software components of a mobile device. Example components of a mobile device are illustrated in FIG. 7, which is described in more detail below. In some examples, mobile device 302 may perform the functionality illustrated in one or more of the blocks shown in FIG. 7 in operating environment 600 of FIG. 6.

Figure 9:
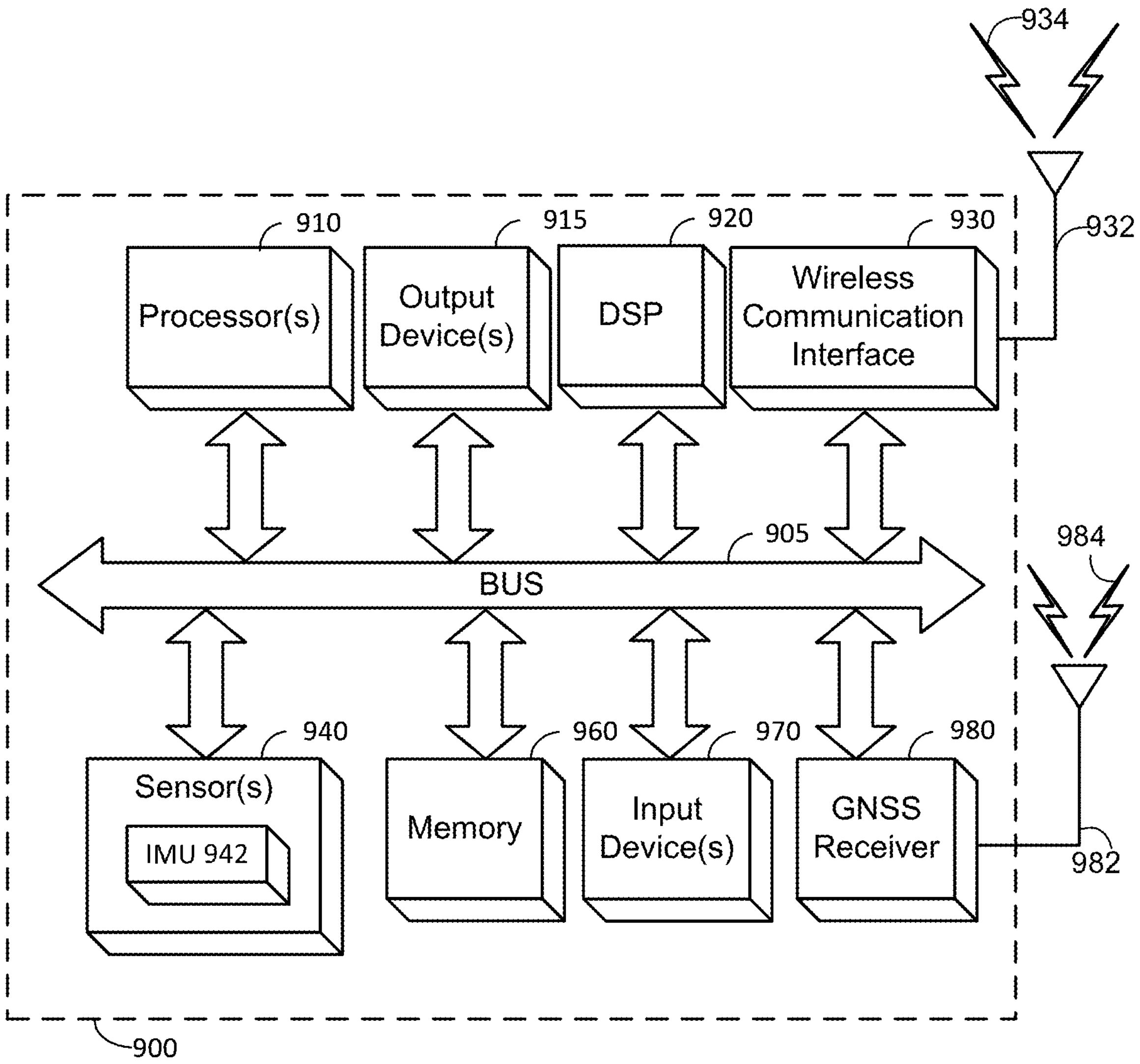
FIG. 9 is a block diagram of an embodiment of a mobile device, which can be utilized in embodiments as described herein.

At block 710, the functionality comprises determining an inertial measurement unit (IMU)-based position differential based on first IMU data received from an IMU of the mobile device. For example, in operating environment 600 of FIG. 6, positioning fusion engine 318 can determine IMU-based position differential 622 based on IMU data 616-1. Means for performing functionality at block 710 may comprise a bus 905, processor(s) 910, memory 960, IMU 942, GNSS receiver 980, and/or other components of a mobile device, as illustrated in FIG. 9.

At block 720, the functionality comprises detecting a wide-lane cycle slip based on a wide-lane differential carrier phase (DCP) measurement and the IMU-based position differential. For example, in operating environment 600 of FIG. 6, GNSS components 304 can detect a wide-lane cycle slip based on wide-lane DCP measurement 624 and IMU-based position differential 622. Means for performing functionality at block 720 may comprise a bus 905, processor(s) 910, memory 960, IMU 942, GNSS receiver 980, and/or other components of a mobile device, as illustrated in FIG. 9. In some implementations, the wide-lane DCP measurement can be obtained by measuring positioning signals on an L1/L5 wide-lane band.

At block 730, the functionality comprises, responsive to detecting the wide-lane cycle slip, applying a correction to the wide-lane DCP measurement based on the IMU-based position differential to obtain a corrected wide-lane DCP measurement. For example, responsive to detecting a wide-lane cycle slip based on wide-lane DCP measurement 624 and IMU-based position differential 622 in operating environment 600 of FIG. 6, GNSS components 304 can apply a correction to wide-lane DCP measurement 624 based on IMU-based position differential 622 to obtain corrected wide-lane DCP measurement 626. Means for performing functionality at block 730 may comprise a bus 905, processor(s) 910, memory 960, IMU 942, GNSS receiver 980, and/or other components of a mobile device, as illustrated in FIG. 9.

In some implementations, applying the correction to the wide-lane DCP measurement can include determining a wide-lane integer ambiguity offset associated with the wide-lane cycle slip and correcting the wide-lane DCP measurement based on the wide-lane integer ambiguity offset. In some implementations, the wide-lane integer ambiguity offset can be determined based on the wide-lane DCP measurement, the IMU-based position differential, and a wide-lane effective wavelength associated with the wide-lane DCP measurement. In some implementations, the wide-lane effective wavelength can be approximately 75 centimeters. In some implementations, a wide-lane carrier phase measurement can be determined based on the corrected wide-lane DCP measurement. In some implementations, a wide-lane carrier phase measurement stream can be generated, and the wide-lane carrier phase measurement stream can include the wide-lane carrier phase measurement determined based on the corrected wide-lane DCP measurement. In some implementations, the wide-lane carrier phase measurement stream can be output via an interface.

At block 740, the functionality comprises generating a global navigation satellite system (GNSS)-based positioning estimate for the mobile device based on the corrected wide-lane DCP measurement. For example, in operating environment 600 of FIG. 6, GNSS positioning engine 310 can generate GNSS-based positioning estimate 612 based on corrected wide-lane DCP measurement 626. Means for performing functionality at block 740 may comprise a bus 905, processor(s) 910, memory 960, IMU 942, GNSS receiver 980, and/or other components of a mobile device, as illustrated in FIG. 9.

In some implementations, the GNSS-based positioning estimate can include an estimated position and an estimated velocity. In some implementations, the estimated position can be a position of the mobile device estimated with respect to three dimensions. In some implementations, the estimated velocity can be a scalar (directionless) parameter representing an estimated speed of motion of the mobile device. In some other implementations, the estimated velocity can be a vector representing an estimated speed of motion of the mobile device and an estimated direction of that motion. In some such implementations, the estimated direction can be a direction of motion of the mobile device estimated with respect to three dimensions.

At block 750, the functionality comprises generating a fusion-based positioning estimate for the mobile device based on the GNSS-based positioning estimate and second IMU data received from the IMU of the mobile device. For example, in operating environment 600 of FIG. 6, positioning fusion engine 318 can generate fusion-based positioning estimate 620 based on GNSS-based positioning estimate 612 and IMU data 616-2. Means for performing functionality at block 750 may comprise a bus 905, processor(s) 910, memory 960, IMU 942, GNSS receiver 980, and/or other components of a mobile device, as illustrated in FIG. 9.

In some implementations, the fusion-based positioning estimate can include an adjusted estimated position and an adjusted estimated velocity. In some implementations, the adjusted estimated position can be a position of the mobile device estimated with respect to three dimensions. In some implementations, the adjusted estimated velocity can be a scalar (directionless) parameter representing an estimated speed of motion of the mobile device. In some other implementations, the adjusted estimated velocity can be a vector representing an estimated speed of motion of the mobile device and an estimated direction of that motion. In some such implementations, the estimated direction can be a direction of motion of the mobile device estimated with respect to three dimensions.

Figure 8:
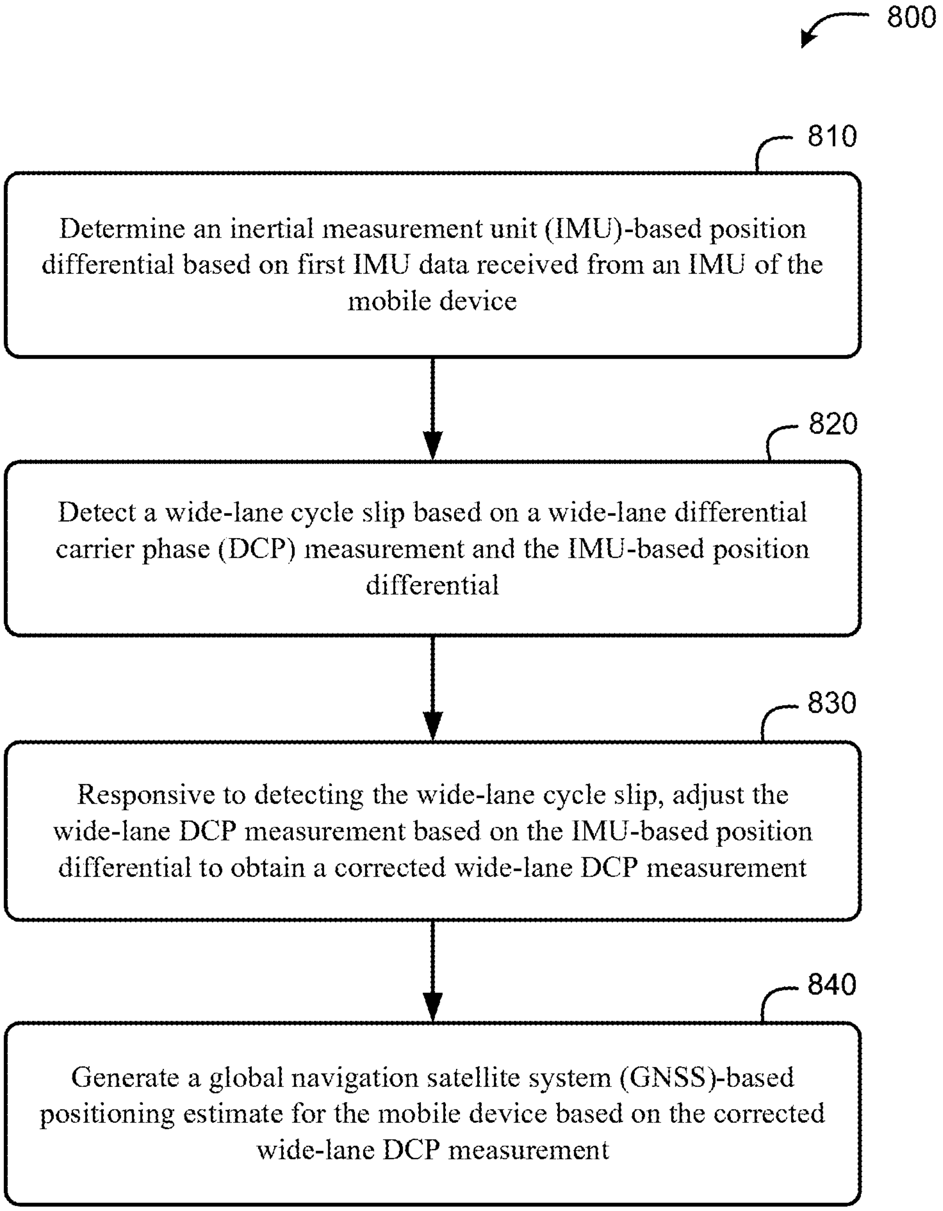
FIG. 8 is a block diagram illustrating a second example positioning method, according to aspects of the disclosure.

FIG. 8 is a block diagram illustrating an example positioning method 800, according to aspects of the disclosure. According to aspects of the disclosure, means for performing the functionality illustrated in one or more of the blocks shown in FIG. 8 may be performed by hardware and/or software components of a mobile device. Example components of a mobile device are illustrated in FIG. 8, which is described in more detail below. In some examples, mobile device 302 may perform the functionality illustrated in one or more of the blocks shown in FIG. 8 in operating environment 600 of FIG. 6.

At block 810, the functionality comprises determining an inertial measurement unit (IMU)-based position differential based on first IMU data received from an IMU of the mobile device. For example, in operating environment 600 of FIG. 6, positioning fusion engine 318 can determine IMU-based position differential 622 based on IMU data 616-1. Means for performing functionality at block 810 may comprise a bus 905, processor(s) 910, memory 960, IMU 942, GNSS receiver 980, and/or other components of a mobile device, as illustrated in FIG. 9.

At block 820, the functionality comprises detecting a wide-lane cycle slip based on a wide-lane differential carrier phase (DCP) measurement and the IMU-based position differential. For example, in operating environment 600 of FIG. 6, GNSS components 304 can detect a wide-lane cycle slip based on wide-lane DCP measurement 624 and IMU-based position differential 622. Means for performing functionality at block 820 may comprise a bus 905, processor(s) 910, memory 960, IMU 942, GNSS receiver 980, and/or other components of a mobile device, as illustrated in FIG. 9. In some implementations, the wide-lane DCP measurement can be obtained by measuring positioning signals on an L1/L5 wide-lane band. In some examples, the wide-lane cycle slip can include a full-cycle slip. In some other examples, the wide-lane cycle slip can include a half-cycle slip.

At block 830, the functionality comprises, responsive to detecting the wide-lane cycle slip, adjusting the wide-lane DCP measurement based on the IMU-based position differential to obtain a corrected wide-lane DCP measurement. For example, responsive to detecting a wide-lane cycle slip based on wide-lane DCP measurement 624 and IMU-based position differential 622 in operating environment 600 of FIG. 6, GNSS components 304 can adjust wide-lane DCP measurement 624 based on IMU-based position differential 622 to obtain corrected wide-lane DCP measurement 626. Means for performing functionality at block 830 may comprise a bus 905, processor(s) 910, memory 960, IMU 942, GNSS receiver 980, and/or other components of a mobile device, as illustrated in FIG. 9.

In some implementations, the adjusting the wide-lane DCP measurement can be based at least in part on a wide-lane integer ambiguity offset, where the wide-lane integer ambiguity offset is associated with the wide-lane cycle slip. In some implementations, the wide-lane integer ambiguity offset can be determined based on the wide-lane DCP measurement, the IMU-based position differential, and a wide-lane effective wavelength associated with the wide-lane DCP measurement. In some implementations, the wide-lane effective wavelength can be approximately 75 centimeters. In some implementations, a wide-lane carrier phase measurement can be determined based on the corrected wide-lane DCP measurement. In some implementations, a wide-lane carrier phase measurement stream can be generated, and the wide-lane carrier phase measurement stream can include the wide-lane carrier phase measurement determined based on the corrected wide-lane DCP measurement. In some implementations, the wide-lane carrier phase measurement stream can be output via an interface.

At block 840, the functionality comprises generating a global navigation satellite system (GNSS)-based positioning estimate for the mobile device based on the corrected wide-lane DCP measurement. For example, in operating environment 600 of FIG. 6, GNSS positioning engine 310 can generate GNSS-based positioning estimate 612 based on corrected wide-lane DCP measurement 626. Means for performing functionality at block 840 may comprise a bus 905, processor(s) 910, memory 960, IMU 942, GNSS receiver 980, and/or other components of a mobile device, as illustrated in FIG. 9.

In some implementations, the GNSS-based positioning estimate can include an estimated position and an estimated velocity. In some implementations, the estimated position can be a position of the mobile device estimated with respect to three dimensions. In some implementations, the estimated velocity can be a scalar (directionless) parameter representing an estimated speed of motion of the mobile device. In some other implementations, the estimated velocity can be a vector representing an estimated speed of motion of the mobile device and an estimated direction of that motion. In some such implementations, the estimated direction can be a direction of motion of the mobile device estimated with respect to three dimensions.

In some implementations, a fusion-based positioning estimate for the mobile device can be generated based on the GNSS-based positioning estimate and second IMU data received from the IMU of the mobile device. For example, in operating environment 600 of FIG. 6, positioning fusion engine 318 can generate fusion-based positioning estimate 620 based on GNSS-based positioning estimate 612 and IMU data 616-2. In some implementations, the fusion-based positioning estimate can include an adjusted estimated position and an adjusted estimated velocity. In some implementations, the adjusted estimated position can be a position of the mobile device estimated with respect to three dimensions. In some implementations, the adjusted estimated velocity can be a scalar (directionless) parameter representing an estimated speed of motion of the mobile device. In some other implementations, the adjusted estimated velocity can be a vector representing an estimated speed of motion of the mobile device and an estimated direction of that motion. In some such implementations, the estimated direction can be a direction of motion of the mobile device estimated with respect to three dimensions.

FIG. 9 is a block diagram of an embodiment of a mobile device 900, which can be utilized as described herein above (e.g., in association with FIGS. 1-7). For example, the mobile device 900 can be used to implement one or both of mobile device 105 of FIG. 1 and mobile device 302 of FIGS. 3 and 6. In some examples, mobile device 900 can perform one or more operations associated with one or more of positioning algorithm 400 of FIG. 4, positioning scheme 500 for FIG. 5, positioning method 700 of FIG. 7, and positioning method 800 of FIG. 8. It should be noted that FIG. 9 is meant only to provide a generalized illustration of various components, any or all of which may be utilized as appropriate. It can be noted that, in some instances, components illustrated by FIG. 9 can be localized to a single physical device and/or distributed among various networked devices, which may be disposed at different physical locations. Furthermore, as previously noted, the functionality of the mobile device discussed in the previously described embodiments may be executed by one or more of the hardware and/or software components illustrated in FIG. 9.

The mobile device 900 is shown comprising hardware elements that can be electrically coupled via a bus 905 (or may otherwise be in communication, as appropriate). The hardware elements may include a processor(s) 910 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 910 may comprise one or more processing units, which may be housed in a single integrated circuit (IC) or multiple ICs. As shown in FIG. 9, some embodiments may have a separate DSP 920, depending on desired functionality. Location determination and/or other determinations based on wireless communication may be provided in the processor(s) 910 and/or wireless communication interface 930 (discussed below). The mobile device 900 also can include one or more input devices 970, which can include without limitation one or more keyboards, touch screens, touch pads, microphones, buttons, dials, switches, and/or the like; and one or more output devices 915, which can include without limitation one or more displays (e.g., touch screens), light emitting diodes (LEDs), speakers, and/or the like.

The mobile device 900 may also include a wireless communication interface 930, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the mobile device 900 to communicate with other devices as described in the embodiments above. The wireless communication interface 930 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 932 that send and/or receive wireless signals 934. According to some embodiments, the wireless communication antenna(s) 932 may comprise a plurality of discrete antennas, antenna arrays, or any combination thereof. The antenna(s) 932 may be capable of transmitting and receiving wireless signals using beams (e.g., Tx beams and Rx beams). Beam formation may be performed using digital and/or analog beam formation techniques, with respective digital and/or analog circuitry. The wireless communication interface 930 may include such circuitry.

Depending on desired functionality, the wireless communication interface 930 may comprise a separate receiver and transmitter, or any combination of transceivers, transmitters, and/or receivers to communicate with base stations (e.g., ng-eNBs and gNBs) and other terrestrial transceivers, such as wireless devices and access points. The mobile device 900 may communicate with different data networks that may comprise various network types. For example, a WWAN may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The mobile device 900 can further include sensor(s) 940. Sensor(s) 940 may comprise, without limitation, one or more inertial sensors and/or other sensors (e.g., accelerometer(s), gyroscope(s), camera(s), magnetometer(s), altimeter (s), microphone(s), proximity sensor(s), light sensor(s), barometer(s), and the like), some of which may be used to obtain position-related measurements and/or other information. Sensor(s) 940 can include an inertial measurement unit (IMU) 942. IMU 942 may comprise, for example, one or more accelerometers (e.g., collectively responding to acceleration of the mobile device 900 in three dimensions) and/or one or more gyroscopes (e.g., three-dimensional gyroscope (s)).

Embodiments of the mobile device 900 may also include a Global Navigation Satellite System (GNSS) receiver 980 capable of receiving signals 984 from one or more GNSS satellites using an antenna 982 (which could be the same as antenna 932). According to aspects of the disclosure, GNSS receiver 980 can be a multi-band GNSS receiver. Positioning based on GNSS signal measurement can be utilized to complement and/or incorporate the techniques described herein. The GNSS receiver 980 can extract a position of the mobile device 900, using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 980 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 980 is illustrated in FIG. 9 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 910, DSP 920, and/or a processor within the wireless communication interface 930 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), particle filter, or the like. The positioning engine may also be executed by one or more processors, such as processor(s) 910 or DSP 920.

The mobile device 900 may further include and/or be in communication with a memory 960. The memory 960 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 960 of the mobile device 900 also can comprise software elements (not shown in FIG. 9), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 960 that are executable by the mobile device 900 (and/or processor(s) 910 or DSP 920 within mobile device 900). In some embodiments, then, such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A positioning method for a mobile device, including determining an inertial measurement unit (IMU)-based position differential based on first IMU data received from an IMU of the mobile device, detecting a wide-lane cycle slip based on a wide-lane differential carrier phase (DCP) measurement and the IMU-based position differential, responsive to detecting the wide lane cycle slip, adjusting the wide-lane DCP measurement based on the IMU-based position differential to obtain a corrected wide-lane DCP measurement, and generating a global navigation satellite system (GNSS)-based positioning estimate for the mobile device based on the corrected wide-lane DCP measurement.

Clause 2. The positioning method of clause 1, where the adjusting the wide lane DCP measurement is based at least in part on a wide-lane integer ambiguity offset, where the wide-lane integer ambiguity offset is associated with the wide-lane cycle slip.

Clause 3. The positioning method of clause 2, including determining the wide-lane integer ambiguity offset based on the wide-lane DCP measurement, the IMU based position differential, and a wide-lane effective wavelength associated with the wide-lane DCP measurement.

Clause 4. The positioning method of any of clauses 1 to 3, further including generating a fusion-based positioning estimate for the mobile device based on the GNSS based positioning estimate and second IMU data received from the IMU of the mobile device.

Clause 5. The positioning method of clause 4, where the GNSS-based positioning estimate includes an estimated position and an estimated velocity, and the fusion-based positioning estimate includes an adjusted estimated position and an adjusted estimated velocity.

Clause 6. The positioning method of any of clauses 1 to 5, further including obtaining the wide-lane DCP measurement by measuring positioning signals on an L1/L5 wide-lane band.

Clause 7. The positioning method of any of clauses 1 to 6, where the wide-lane cycle slip includes a full cycle slip.

Clause 8. The positioning method of any of clauses 1 to 6, where the wide-lane cycle slip includes a half cycle slip.

Clause 9. The positioning method of any of clauses 1 to 8, further including determining a wide-lane carrier phase measurement based on the corrected wide-lane DCP measurement.

Clause 10. The positioning method of clause 9, further including generating a wide-lane carrier phase measurement stream, and outputting the wide-lane carrier phase measurement stream via an interface, where the wide-lane carrier phase measurement stream includes the wide-lane carrier phase measurement.

Clause 11. A positioning apparatus for a mobile device, including a multi-band global navigation satellite system (GNSS) receiver, a memory, and one or more processors communicatively coupled with the multi-band GNSS receiver and the memory, where the one or more processors are configured to determine an inertial measurement unit (IMU)-based position differential based on first IMU data received from an IMU of the mobile device, detect a wide-lane cycle slip based on a wide-lane differential carrier phase (DCP) measurement and the IMU-based position differential, responsive to detecting the wide lane cycle slip, adjust the wide-lane DCP measurement based on the IMU-based position differential to obtain a corrected wide-lane DCP measurement, and generate a GNSS-based positioning estimate for the mobile device based on the corrected wide-lane DCP measurement.

Clause 12. The positioning apparatus of clause 11, where the adjusting the wide-lane DCP measurement is based at least in part on a wide-lane integer ambiguity offset, where the wide-lane integer ambiguity offset is associated with the wide-lane cycle slip.

Clause 13. The positioning apparatus of clause 12, where the one or more processors are configured to determine the wide-lane integer ambiguity offset based on the wide-lane DCP measurement, the IMU based position differential, and a wide-lane effective wavelength associated with the wide-lane DCP measurement.

Clause 14. The positioning apparatus of any of clauses 11 to 13, where the one or more processors are configured to generate a fusion-based positioning estimate for the mobile device based on the GNSS based positioning estimate and second IMU data received from the IMU of the mobile device.

Clause 15. The positioning apparatus of clause 14, where the GNSS-based positioning estimate includes an estimated position and an estimated velocity, and the fusion-based positioning estimate includes an adjusted estimated position and an adjusted estimated velocity.

Clause 16. The positioning apparatus of any of clauses 11 to 15, where the one or more processors are configured to obtain the wide-lane DCP measurement by measuring positioning signals on an L1/L5 wide-lane band.

Clause 17. The positioning apparatus of any of clauses 11 to 16, where the wide-lane cycle slip includes a full cycle slip.

Clause 18. The positioning apparatus of any of clauses 11 to 16, where the wide-lane cycle slip includes a half cycle slip.

Clause 19. The positioning apparatus of any of clauses 11 to 18, where the one or more processors are configured to determine a wide-lane carrier phase measurement based on the corrected wide-lane DCP measurement.

Clause 20. The positioning apparatus of clause 19, where the one or more processors are configured to generate a wide-lane carrier phase measurement stream, and output the wide-lane carrier phase measurement stream via an interface, where the wide-lane carrier phase measurement stream includes the wide-lane carrier phase measurement.

Clause 21. A positioning apparatus for a mobile device, including means for determining an inertial measurement unit (IMU)-based position differential based on first IMU data received from an IMU of the mobile device, means for detecting a wide-lane cycle slip based on a wide-lane differential carrier phase (DCP) measurement and the IMU-based position differential, means for responsive to detecting the wide lane cycle slip, adjusting the wide-lane DCP measurement based on the IMU-based position differential to obtain a corrected wide-lane DCP measurement, and means for generating a global navigation satellite system (GNSS)-based positioning estimate for the mobile device based on the corrected wide-lane DCP measurement.

Clause 22. The positioning apparatus of clause 21, where the adjusting the wide-lane DCP measurement is based at least in part on a wide-lane integer ambiguity offset, where the wide-lane integer ambiguity offset is associated with the wide-lane cycle slip.

Clause 23. The positioning apparatus of clause 22, including means for determining the wide-lane integer ambiguity offset based on the wide-lane DCP measurement, the IMU based position differential, and a wide-lane effective wavelength associated with the wide-lane DCP measurement.

Clause 24. The positioning apparatus of any of clauses 21 to 23, including means for generating a fusion-based positioning estimate for the mobile device based on the GNSS based positioning estimate and second IMU data received from the IMU of the mobile device.

Clause 25. The positioning apparatus of clause 24, where the GNSS-based positioning estimate includes an estimated position and an estimated velocity, and the fusion-based positioning estimate includes an adjusted estimated position and an adjusted estimated velocity.

Clause 26. The positioning apparatus of any of clauses 21 to 25, further including means for obtaining the wide-lane DCP measurement by measuring positioning signals on an L1/L5 wide-lane band.

Clause 27. The positioning apparatus of any of clauses 21 to 26, where the wide-lane cycle slip includes a full cycle slip.

Clause 28. The positioning apparatus of any of clauses 21 to 26, where the wide-lane cycle slip includes a half cycle slip.

Clause 29. The positioning apparatus of any of clauses 21 to 28, further including means for determining a wide-lane carrier phase measurement based on the corrected wide-lane DCP measurement.

Clause 30. The positioning apparatus of clause 29, further including means for generating a wide-lane carrier phase measurement stream, and means for outputting the wide-lane carrier phase measurement stream via an interface, where the wide-lane carrier phase measurement stream includes the wide-lane carrier phase measurement.

Clause 31. A non-transitory computer-readable medium storing instructions for positioning for a mobile device, the instructions including code for determining an inertial measurement unit (IMU)-based position differential based on first IMU data received from an IMU of the mobile device, detecting a wide-lane cycle slip based on a wide-lane differential carrier phase (DCP) measurement and the IMU-based position differential, responsive to detecting the wide lane cycle slip, adjusting the wide-lane DCP measurement based on the IMU-based position differential to obtain a corrected wide-lane DCP measurement, and generating a global navigation satellite system (GNSS)-based positioning estimate for the mobile device based on the corrected wide-lane DCP measurement.

Clause 32. The non-transitory computer-readable medium of clause 31, where the adjusting the wide-lane DCP measurement is based at least in part on a wide-lane integer ambiguity offset, where the wide-lane integer ambiguity offset is associated with the wide-lane cycle slip.

Clause 33. The non-transitory computer-readable medium of clause 32, the instructions including code for determining the wide-lane integer ambiguity offset based on the wide-lane DCP measurement, the IMU based position differential, and a wide-lane effective wavelength associated with the wide-lane DCP measurement.

Clause 34. The non-transitory computer-readable medium of any of clauses 31 to 33, the instructions further including code for generating a fusion-based positioning estimate for the mobile device based on the GNSS based positioning estimate and second IMU data received from the IMU of the mobile device.

Clause 35. The non-transitory computer-readable medium of clause 34, where the GNSS-based positioning estimate includes an estimated position and an estimated velocity, and the fusion-based positioning estimate includes an adjusted estimated position and an adjusted estimated velocity.

Clause 36. The non-transitory computer-readable medium of any of clauses 31 to 35, the instructions further including code for obtaining the wide-lane DCP measurement by measuring positioning signals on an L1/L5 wide-lane band.

Clause 37. The non-transitory computer-readable medium of any of clauses 31 to 36, where the wide-lane cycle slip includes a full cycle slip.

Clause 38. The non-transitory computer-readable medium of any of clauses 31 to 36, where the wide-lane cycle slip includes a half cycle slip.

Clause 39. The non-transitory computer-readable medium of any of clauses 31 to 38, the instructions further including code for determining a wide-lane carrier phase measurement based on the corrected wide-lane DCP measurement.

Clause 40. The non-transitory computer-readable medium of clause 39, the instructions further including code for generating a wide-lane carrier phase measurement stream, and outputting the wide-lane carrier phase measurement stream via an interface, where the wide-lane carrier phase measurement stream includes the wide-lane carrier phase measurement.

What is claimed is:

1. A positioning method for a mobile device, comprising:

determining an inertial measurement unit (IMU)-based position differential based on first IMU data received from an IMU of the mobile device;

detecting a wide-lane cycle slip based on a wide-lane differential carrier phase (DCP) measurement and the IMU-based position differential;

responsive to detecting the wide-lane cycle slip, adjusting the wide-lane DCP measurement based on the IMU-based position differential to obtain a corrected wide-lane DCP measurement using a wide-lane integer ambiguity offset associated with the wide-lane cycle slip; and generating a global navigation satellite system (GNSS)-based positioning estimate for the mobile device based on the corrected wide-lane DCP measurement.

2. The positioning method of claim 1, further comprising determining the wide-lane integer ambiguity offset.

3. The positioning method of claim 2, comprising determining the wide-lane integer ambiguity offset based on the wide-lane DCP measurement, the IMU-based position differential, and a wide-lane effective wavelength associated with the wide-lane DCP measurement.

4. The positioning method of claim 1, further comprising generating a fusion-based positioning estimate for the mobile device based on the GNSS-based positioning estimate and second IMU data received from the IMU of the mobile device.

5. The positioning method of claim 4, wherein the GNSS-based positioning estimate includes an estimated position and an estimated velocity, and the fusion-based positioning estimate includes an adjusted estimated position and an adjusted estimated velocity.

6. The positioning method of claim 1, further comprising obtaining the wide-lane DCP measurement by measuring positioning signals on an L1/L5 wide-lane band.

7. The positioning method of claim 1, wherein the wide-lane cycle slip comprises a full-cycle slip.

8. The positioning method of claim 1, wherein the wide-lane cycle slip comprises a half-cycle slip.

9. The positioning method of claim 1, further comprising determining a wide-lane carrier phase measurement based on the corrected wide-lane DCP measurement.

10. The positioning method of claim 9, further comprising:

generating a wide-lane carrier phase measurement stream; and outputting, via an interface, the wide-lane carrier phase measurement stream;

wherein the wide-lane carrier phase measurement stream includes the wide-lane carrier phase measurement.

11. A positioning apparatus for a mobile device, comprising:

an inertial measurement unit (IMU);

a multi-band global navigation satellite system (GNSS) receiver;

a memory; and one or more processors communicatively coupled with the IMU, the multi-band GNSS receiver, and the memory, wherein the one or more processors are configured to:

determine an IMU-based position differential based on first IMU data received from the IMU;

detect a wide-lane cycle slip based on a wide-lane differential carrier phase (DCP) measurement received from the multi-band GNSS receiver and the IMU-based position differential;

responsive to detecting the wide-lane cycle slip, adjust the wide-lane DCP measurement based on the IMU-based position differential to obtain a corrected wide-lane DCP measurement using a wide-lane integer ambiguity offset associated with the wide-lane cycle slip; and generate a GNSS-based positioning estimate for the mobile device based on the corrected wide-lane DCP measurement.

12. The positioning apparatus of claim 11, wherein the one or more processors are configured to determine the wide-lane integer ambiguity offset.

13. The positioning apparatus of claim 12, wherein the one or more processors are configured to determine the wide-lane integer ambiguity offset based on the wide-lane DCP measurement, the IMU-based position differential, and a wide-lane effective wavelength associated with the wide-lane DCP measurement.

14. The positioning apparatus of claim 11, wherein the one or more processors are configured to generate a fusion-based positioning estimate for the mobile device based on the GNSS-based positioning estimate and second IMU data received from the IMU.

15. The positioning apparatus of claim 14, wherein the GNSS-based positioning estimate includes an estimated position and an estimated velocity, and the fusion-based positioning estimate includes an adjusted estimated position and an adjusted estimated velocity.

16. The positioning apparatus of claim 11, wherein the multi-band GNSS receiver is configured to obtain the wide-lane DCP measurement by measuring positioning signals on an L1/L5 wide-lane band.

17. The positioning apparatus of claim 11, wherein the wide-lane cycle slip comprises a full-cycle slip.

18. The positioning apparatus of claim 11, wherein the wide-lane cycle slip comprises a half-cycle slip.

19. The positioning apparatus of claim 11, wherein the one or more processors are configured to determine a wide-lane carrier phase measurement based on the corrected wide-lane DCP measurement.

20. The positioning apparatus of claim 19, wherein the one or more processors are configured to:

generate a wide-lane carrier phase measurement stream; and output the wide-lane carrier phase measurement stream via an interface;

wherein the wide-lane carrier phase measurement stream includes the wide-lane carrier phase measurement.

21. A positioning apparatus for a mobile device, comprising:

means for determining an inertial measurement unit (IMU)-based position differential based on first IMU data received from an IMU of the mobile device;

means for detecting a wide-lane cycle slip based on a wide-lane differential carrier phase (DCP) measurement and the IMU-based position differential;

means for, responsive to detecting the wide-lane cycle slip, adjusting the wide-lane DCP measurement based on the IMU-based position differential to obtain a corrected wide-lane DCP measurement using a wide-lane integer ambiguity offset associated with the wide-lane cycle slip; and means for generating a global navigation satellite system (GNSS)-based positioning estimate for the mobile device based on the corrected wide-lane DCP measurement.

22. The positioning apparatus of claim 21, further comprising means for determining the wide-lane integer ambiguity offset.

23. The positioning apparatus of claim 22, comprising means for determining the wide-lane integer ambiguity offset based on the wide-lane DCP measurement, the IMU-based position differential, and a wide-lane effective wavelength associated with the wide-lane DCP measurement.

24. The positioning apparatus of claim 21, further comprising means for generating a fusion-based positioning estimate for the mobile device based on the GNSS-based positioning estimate and second IMU data received from the IMU of the mobile device.

25. The positioning apparatus of claim 21, further comprising means for obtaining the wide-lane DCP measurement by measuring positioning signals on an L1/L5 wide-lane band.

26. A non-transitory computer-readable medium storing instructions for positioning for a mobile device, the instructions comprising code to:

determine an inertial measurement unit (IMU)-based position differential based on first IMU data received from an IMU of the mobile device;

detect a wide-lane cycle slip based on a wide-lane differential carrier phase (DCP) measurement and the IMU-based position differential;

responsive to the detected wide-lane cycle slip, adjust the wide-lane DCP measurement based on the IMU-based position differential to obtain a corrected wide-lane DCP measurement using a wide-lane integer ambiguity offset associated with the wide-lane cycle slip; and generate a global navigation satellite system (GNSS)-based positioning estimate for the mobile device based on the corrected wide-lane DCP measurement.

27. The non-transitory computer-readable medium of claim 26, wherein the instructions comprising code to determine the wide-lane integer ambiguity offset.

28. The non-transitory computer-readable medium of claim 27, the instructions comprising code to determine the wide-lane integer ambiguity offset based on the wide-lane DCP measurement, the IMU-based position differential, and a wide-lane effective wavelength associated with the wide-lane DCP measurement.

29. The non-transitory computer-readable medium of claim 26, the instructions further comprising code to generate a fusion-based positioning estimate for the mobile device based on the GNSS-based positioning estimate and second IMU data received from the IMU of the mobile device.

30. The non-transitory computer-readable medium of claim 26, the instructions further comprising code to obtain the wide-lane DCP measurement via measurement of positioning signals on an L1/L5 wide-lane band.

* * * * *